Dec. 30, 1941.   C. L. MATTISON   2,267,937
WORK GAUGE AND GUIDE FOR WOODWORKING MACHINES
Filed July 7, 1938
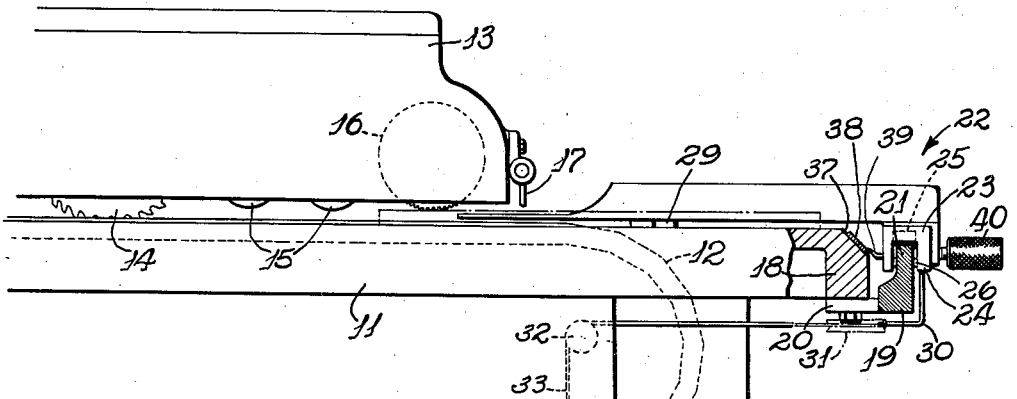
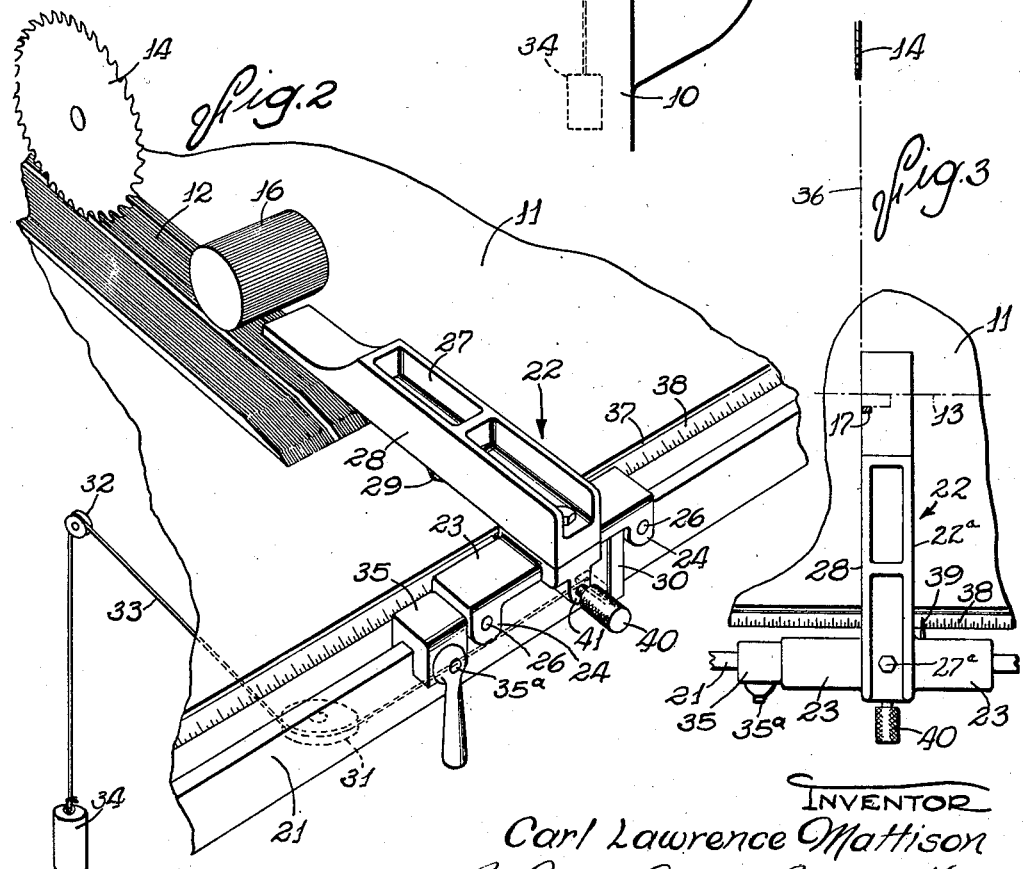
INVENTOR
Carl Lawrence Mattison
By Parker, Carlson, Pitzner & Hubbard
ATTORNEYS

Patented Dec. 30, 1941

2,267,937

UNITED STATES PATENT OFFICE

2,267,937

WORK GAUGE AND GUIDE FOR WOOD-WORKING MACHINES

Carl Lawrence Mattison, Rockford, Ill., assignor to Mattison Machine Works, Rockford, Ill., a corporation of Illinois Application July 7, 1938, Serial No. 217,882

1 Claim. (Cl. 143—174)

The invention relates to work gauges and guides for woodworking machines and has as its general aim the provision of a device of this character which enables the operator to use a machine with which the device is associated conveniently and with high efficiency.

In woodworking machines, work gauges and guides have been provided which customarily have a fixed relation to the machine, or more particularly to the cutting tool, during actual use or operation of the machine. In such prior devices, the gauge or guide must be readjusted for each deviation of the dimension of a work piece from the dimension for which the device is set; the various adjustments of the position of the device are difficult to make since the operator must steady the work piece with one hand while effecting the adjustment of the device with the other hand; and it is impossible for the operator conveniently to make allowance for uneven or crooked work pieces.

An object of the invention, therefore, is to provide a new and improved work gauge and guide device for woodworking machines which enables the operator to support and steady the work piece with both hands while arranging the work piece properly against the device and locating the work piece with suitable accuracy with respect to the line of cutting action of the machine, which readily permits the operator to compensate for uneven or crooked work pieces and which is instantly adjustable to meet varying work piece or cut dimensions.

Another object is to provide a new and improved device of this character wherein the gauging or guiding portion of the device is a freely movable unit which is normally urged toward an initial starting position for engagement by the work piece and is yieldably movable to a desired gauging and guiding position by a force transmitted thereto through the work piece.

Another object resides in the provision in such a device of means for exerting a normal urging force on the movable part thereof which is substantially constant regardless of the operating position of said part.

Other objects and advantages will become apparent in the following description and from the accompanying drawing, in which:

Figure 1 is a fragmentary end elevation partially in section of a woodworking machine equipped with a device embodying the features of the invention.

Fig. 2 is a somewhat diagrammatic view of the machine in perspective and illustrates the construction and arrangement of the gauge and guide device.

Fig. 3 is a fragmentary plan view showing a preferred starting relation of the device to the machine elements.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For the purpose of exemplary illustration and description, a power driven rotary ripsaw has been selected as representative of a woodworking machine with which a gauge and guide device embodying the invention is associated. It is to be understood, however, that the invention may be utilized with machines other than the one shown. In the drawing, the numeral 10 indicates generally a machine base supporting a table or bed 11. An endless feed chain 12 of conventional type is mounted on the base with a portion of its upper run projecting slightly above the table surface for work-piece engagement. A head 13 supports a power driven rotary saw 14 in approximate opposition to the longitudinal median line of the feed chain for operation upon a work piece carried to and past it by said chain. The head also supports hold down and feed rolls 15 and 16 in advance of the saw, the first of which (herein the roll 16) may be knurled. On the front side of the head is an adjustable depending finger 17 for indicating the line of cutting action of the saw. Preferably this finger is so arranged, as shown in Fig. 3, that its left-hand edge is located substantially on the line or plane of the right-hand face of the saw.

A gauge and guide device which embodies the present invention may comprise the following arrangement of parts. Extending across and spaced from the front edge 18 of the table approximately at right angles to the longitudinal line of the feed chain and saw is an elongated rail 19 fixed with respect to the table by such means as brackets 20. The upper edge of the rail may be of reduced width, as indicated at 21, and this edge supports a movable gauge and guide unit, generally designated 22.

The unit 22 is a T-shaped structure which embodies a base 23 of substantial length having depending side arms 24 at the corners arranged to straddle the upper edge of the rail 21. The base may carry such means as antifriction rollers 25 (Fig. 1) for engagement with the upper face of the rail and inwardly extending positioning pins 26 on the arms determine and maintain the base in proper alinement with the rail. The base is thus mounted for free reciprocatory movement. A horizontally extending arm 27, which, in this instance, is a separate part secured to the base by a screw 27a or the like, is arranged to overlie and extend rearwardly across the front portion of the table in closely spaced relation to the table surface. The arm has sizable side faces 28 and 22a for workpiece engagement and extends substantially to the front roll 16, the free end of the arm being of reduced dimensions to clear the head. Toward its free end, the arm may be provided with table-engaging supporting or bearing means 29 for slidably spacing this end of the arm from the table.

The gauge and guide unit has means associated therewith for normally urging it yieldably in one direction, usually toward an idle or rest position. It is preferred that gravity be employed as the urging force to obtain uniformity of the force imposed regardless of the position of the unit. In this instance, the base of the unit has fixed thereto an L-shaped bracket 30 projecting downwardly in front of and beneath the rail 19. A pulley 31 is fixed to the table beyond the extreme position to which the assembly will be moved and a second pulley 32 is mounted within the base. A cable 33 is connected at one end to the bracket, is led about the pulleys 31, 32, and is fastened to a weight 34 of sufficient mass to insure movement of the unit to its initial position when released. By this arrangement, the device may move bodily through a wide range, yet the returning force exerted thereon is always substantially the same. The initial position of the unit may be suitably determined by such means as an adjustable stop 35 adapted to be detachably secured, by such means as a handle-operated set screw 35a, at any desired point along the rail.

The front upper corner of the table may be beveled, as at 37, to receive a member 38 presenting a scale or other desired indicia, and a coordinating pointer 39 (Figs. 1 and 3) is so arranged on the unit that it may be readily seen by the operator. In this instance, the pointer is located on the right-hand side of the arm 27.

In operation, the stop means 35 is properly fixed on the rail to designate the starting position of the device. In this position, when the machine is idle, the work-engaging face 28 of the arm will usually be located on the line of the saw and preferably on the line of the right-hand face of the saw and left-hand side of the pointer 17. This line is indicated at 36, Fig. 3. The face 28 may, however, be spaced from the line a distance in which the spacing would be less than the width of the cut to be made. The operator places a work piece against the face 28, makes certain that the work piece is in full face contact therewith, and, while holding the work piece with both hands, slides the unit and work piece laterally until a desired line of cut, as determined by either pointer 17 or 39, is reached. The operator then advances the work piece for engagement between the fed chain 12 and feed roll 16.

The pointer 17 may be advantageously used in matching pieces of material, since it enables the operator to select with sufficient accuracy the portion of the work piece to be cut out. The pointer 39 enables the operator conveniently to cut a large number of work pieces into narrower widths which may be of various dimensions. By this arrangement, it is not necessary for the operator to adjust the device each time a cut of a different width is to be made, nor is it necessary for him to remove either hand from the work piece while bringing the piece to any desired position. The proper entrance of the work piece into the machine may be effected with great certainty and convenience, and with the necessary accuracy. Moreover, the relative freedom of movement of the gauge and guide unit compensates for irregularities in the shape of the work piece, and allows work pieces of widely varying dimensions to be handled, since the range of movement of the device is, for all practical purposes, unlimited. The device returns immediately to its original position after a work piece has cleared it, and the returning force, in the illustrated embodiment, is uniform in all positions of the device.

In the event a stationary gauge and guide is desired, the unit may embody such means as a manipulable set screw 40 carried by a finger 41 formed integrally with the base 23 to extend downwardly along the outer side face of the rail for optional clamping engagement with the rail.

Alternatively the stop 35 may be so located as to position the guide 28 to the right of the line of cut a distance corresponding to the width of the cut to be made. In such event, the construction is advantageous in that the guide while serving to position the work is yieldable to compensate for irregularities in the work.

I claim as my invention:

In a woodworking machine having a table, a rotary cutter and feed means for delivering a work piece to the cutter; means providing a guideway along the forward edge of the table perpendicular to the line of feed of the work, a guide device comprising a base member mounted for free traveling movement along said guideway and an arm carried by and projecting rearwardly from the base member above the table and adapted to position a work piece for engagement by said feed means, a stop mounted on said guideway, and means for yieldably holding said base member against said stop, said stop being adjustable along the guideway to vary the position of said arm relative to the line of cut.

CARL LAWRENCE MATTISON.